United States Patent [19]
Sakai et al.

[11] 3,979,972
[45] Sept. 14, 1976

[54] HYDROMECHANICAL TRANSMISSION

[75] Inventors: Toshimitsu Sakai; Takayuki Miyao, both of Toyota, Japan

[73] Assignees: Toyota Jidosha Kogyo Kabushiki Kaisha, Toyota; Aisin Seiki Kabushiki Kaisha, Kariya, both of Japan

[22] Filed: Jan. 31, 1975

[21] Appl. No.: 545,904

[30] Foreign Application Priority Data
Feb. 6, 1974   Japan................................. 49-14442

[52] U.S. Cl. .................................................. 74/687
[51] Int. Cl.² ........................................ F16H 47/04
[58] Field of Search................. 74/68.7, 720.5, 689, 74/690

[56] References Cited
UNITED STATES PATENTS

| | | | |
|---|---|---|---|
| 3,433,095 | 3/1969 | Tuck..................................... | 74/687 |
| 3,667,321 | 6/1972 | Maurice........................... | 74/687 X |
| 3,675,507 | 7/1972 | Takekawa............................ | 74/687 |

*Primary Examiner*—Samuel Scott
*Assistant Examiner*—Lance W. Chandler
*Attorney, Agent, or Firm*—Oblon, Fisher, Spivak, McClelland & Maier

[57] ABSTRACT

A hydromechanical transmission comprises a first and a second planetary gear sets drivingly connected to an output shaft to provide a low and a high speed ratio drive power trains between a transmision input shaft and the output shaft to control the speed ratio of the output shaft and a variable ratio hydrostatic drive unit to control operation of the two planetary gear sets. Between the input shaft and the input member of the first planetary gear set, provided is a low speed range clutch by way of a speed reduction gear train to selectively connect the input shaft to the first planetary gear set. Between the input shaft and the input member of the second planetary gear set, provided is a high speed range clutch to directly connect the input shaft to the second planetary gear set on engagement thereof.

12 Claims, 10 Drawing Figures

HYDROMECHANICAL TRANSMISSION

BACKGROUND OF THE INVENTION

This invention relates to an output split type hydrostatic transmission, and more particularly to an improved hydromechanical transmission having a variable ratio hydrostatic drive unit and a hydraulically controlled differential gear unit to provide a plurality of speed range drives by selective operation of a plurality of clutch engagement mechanisms provided therewith.

There have been introduced some hydromechanical transmissions of this type, wherein the transmission input shafts are directly connected to the differential gear units. With such a hydromechanical transmission as mentioned, certain gears of the differential gear unit have undesired high rotation speed in some drive ranges of high speed ratios only to cause vibrations and noises. Therefore, the rotation speed of the prime engines has to be controlled or a low speed rotation engine such as diesel engine has to be used for the prime power source. Furthermore, in the case that the transmission input torque is given to the differential gear unit through a speed reduction gear train, the speed reduction gear train causes much loss in torque transmission, vibrations and noises in the high speed range drive.

SUMMARY OF THE INVENTION

An object of the present invention is, therefore, to provide an improved hydromechanical transmission, wherein the transmission input torque is transmitted to a differential gear unit through a speed reduction gear train while the prime engine is conditioned to provide low speed range forward drive and directly to the differential gear unit while the prime engine is conditioned to provide high speed range forward drive, thereby to eliminate vibrations, noises and torque transmission loss.

Another object of the present invention is to provide a hydromechanical transmission, having the above mentioned characteristics, wherein the standard speed ratios in the low and high speed range forward drive are respectively determined at their best values to provide high torque transmission efficiency in a wide speed ratio range from under-drive to over-drive so as to operate the prime engine always in its best condition.

Still another object of the present invention is to provide a hydromechanical transmission, having the above mentioned characteristics, wherein the switchover operation between a low speed range clutch and a high speed range clutch is synchronously conducted at the mode switch-over speed ratio of the transmission to eliminate shocks given to the clutch mechanisms.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
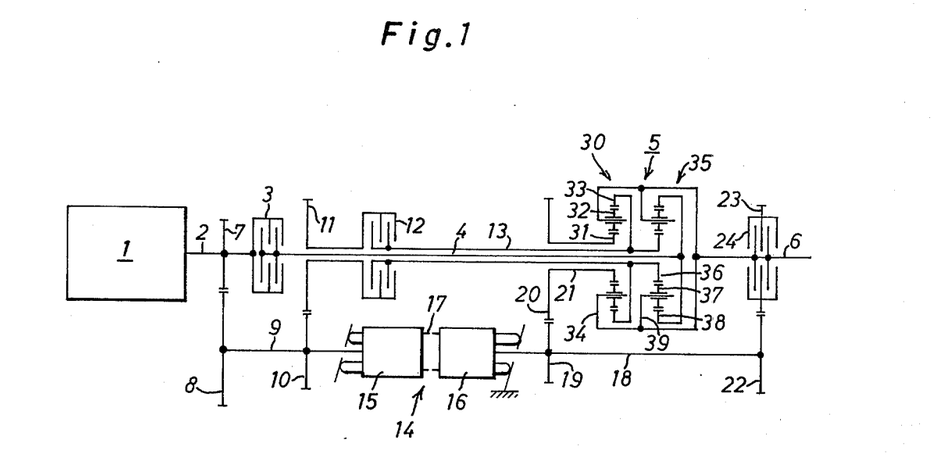
FIG. 1 diagrammatically shows an embodiment of a hydromechanical transmission according to the present invention.

Referring now to the drawings, FIG. 1 illustrates a preferred embodiment of an output split type hydromechanical transmission in accordance with the present invention. In this hydromechanical transmission, a transmission input shaft 2 driven by a prime engine 1 is coaxially connected with an output shaft 6 for connection to the vehicle's driving wheels by way of a high speed range clutch 3, a first intermediate shaft 4 and a hydraulically controlled differential gear unit 5. The transmission input shaft 2 is further connected with the differential gear unit 5 by way of first reduction gears 7 and 8 in mesh with each other, a driving shaft 9 in parallel with the shafts 2 and 4, second speed reduction gears 10 and 11 in mesh with each other, a low speed range clutch 12 and a second intermediate sleeve shaft 13 in surrounding relationship to the first intermediate shaft 4.

A variable ratio hydrostatic drive unit 14 includes a variable positive displacement pump-motor 15 which is connected to the right end of the driving shaft 9. The pump-motor 15 is an axial plunger hydraulic unit of conventional construction so that a detailed description need not be contained herein. The displacement of the pump-motor 15 is varied by its swash plate to control hydraulic fluid to be supplied into a fixed positive displacement pump-motor 16 which is also of the conventional axial plunger hydraulic unit and drivingly connected to a shaft 18 in parallel with the shafts 4 and 6. The fixed displacement pump-motor 16 is conditioned to its maximum displacement and hydraulically connected with the variable pump-motor 15 by means of a hydraulic closed circuit 17 so that the pump-motor 16 is operated as a motor when the pump-motor 15 is driven as a pump by the driving shaft 9. The shaft 18 is axially aligned with the driving shaft 9 and provided thereon with a gear 19 in mesh with a gear 20 which is fixed on a reaction shaft 21 in surrounding relationship to the second intermediate shaft 13. The shaft 18 is also provided thereon with a gear 22 in mesh with a gear 23 which is provided on the input member of a reverse range clutch 24. Thus, the pump-motor 16 is drivingly connected to the differential gear unit 5 by way of the shaft 18, the gears 19 and 20 and the reaction shaft 21 and further connected on engagement of the reverse range clutch 24 to the output shaft 6 by way of the shaft 18, the gears 22 and 23 and the reverse range clutch 24. The three clutches 3, 12 and 24 are concentric with the central axis of the differential gear unit 5.

The differential gear unit 5 comprises a first single planetary gear set 30 to be operated in response to the engagement of the low speed range clutch 12 and a second single planetary gear set 35 to be operated in response to the engagement of the high speed range clutch 3. The first single planetary gear set 30 includes a sun gear 31 connected to the reaction shaft 21, a pinion 32 journalled by a carrier member 34, and a ring member 33 connected to the second intermediate shaft 13. The carrier member 34 is connected to the output shaft 6. Thus, on engagement of the low speed range clutch 12, the input shaft 2 is connected to drive the ring gear 33 of the first single planetary gear set 30 in the same direction thereby to establish the low speed range forward drive gear train. The second single planetary gear set 35 includes a sun gear 36 connected to the second intermediate shaft 13, a pinion 37 journalled by a carrier member 39, and a ring gear 38 connected to the first intermediate shaft 4. The carrier member 39 is integrally connected with the carrier member 34. Thus, on engagement of the high speed range clutch 3, the input shaft 2 is connected to directly drive the ring gear 38 in the same direction thereby to establish the high speed range forward drive gear train.

Figure 2:
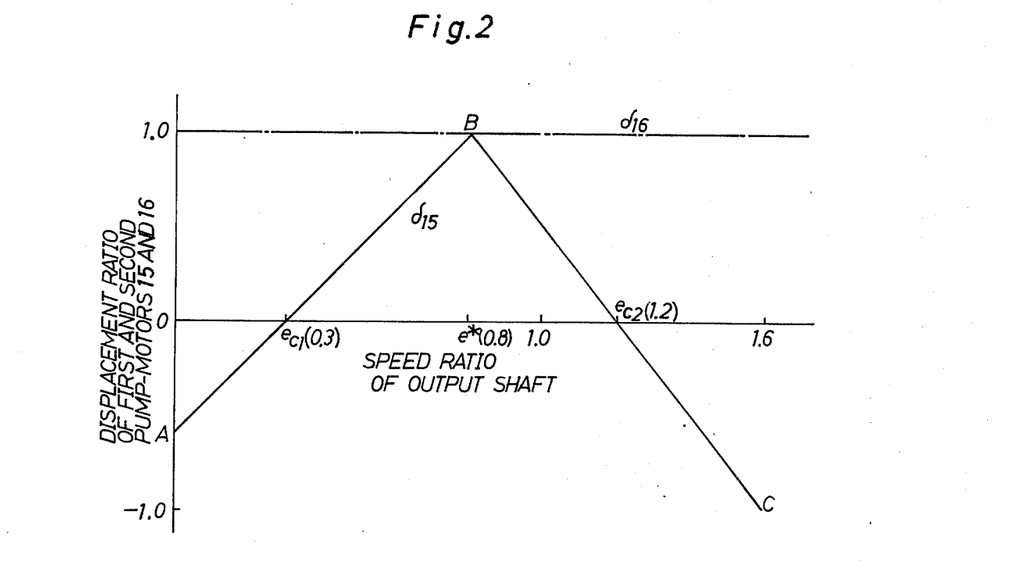
FIGS. 2, 3 and 4 are graphic charts illustrating certain operating characteristics of the embodiment shown in FIG. 1.
Figure 3:
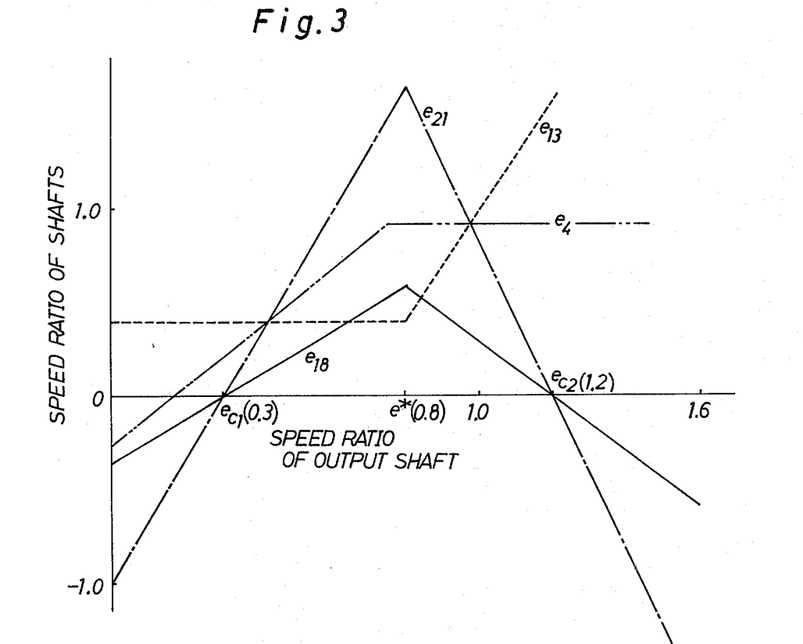

Describing now the mode of operation of the hydromechanical transmission shown in FIG. 1 in reference with FIGS. 2 and 3, the abscissa axis of FIG. 2 represents the rotation speed ratio of the output shaft 6 against the input shaft 2 and the ordinate axis of the FIG. 2 represents the displacement ratio of the pump-motors 15 and 16 against their full displacements, the displacements of the pump-motors 15 and 16 being respectively indicated by characters $\delta_{15}$ and $\delta_{16}$. In FIG. 3, the abscissa axis represents the rotation speed ratio of the output shaft 6 against the input shaft 2 as same as that of FIG. 1 and the rotation speed ratios of the respective shafts 4, 13, 18 and 21 against the input shaft 2 are indicated by lines $e_4$, $e_{13}$, $e_{18}$ and $e_{21}$.

While all of the three clutches 3, 12 and 24 are released to provide the neutral condition of the hydromechanical transmission, rotation torque given to the transmission input shaft 2 from the engine 1 may not be transmitted to the first and second intermediate shafts 4 and 13 to cause the inoperative state of the differential gear unit 5. Under this condition, although the pump-motor 15 is drivingly connected to the input shaft 2 through the reduction gears 7 and 8 and the driving shaft 9 to conduct the motor action of the pump-motor 16, the pump-motor 16 merely keeps its idling rotation by the pumping operation of the pump-motor 15 because the shaft 18 rotates freely due to the disengagement of the reverse range clutch 24.

To establish the low speed range forward drive, the low speed range clutch 12 is engaged to drive the ring gear 33 of the first planetary gear set 30 by way of the gear train including the speed reduction gears 7, 8, 10 and 11 and the second intermediate shaft 13 and, under this state, the pump-motor 15 of the hydrostatic drive unit 14 is conditioned to its negative full displacement as shown by the point A of FIG. 2. In this low speed range forward drive, the rotation torque of the input shaft 2 is transmitted to the output shaft 6 by way of the low range output planetary gear train including the first and second reduction gears 7, 8, 10 and 11, and the ring gear 33 and the pinion 32 of the first planetary gear set 30. Simultaneously the rotation torque given to the ring gear 33 from the input shaft 2 is transmitted to the shaft 18 by way of the gear train including the pinion 32, the sun gear 31 and the gears 20 and 19 so that the pump-motor 16 is driven as a pump. The fluid pressure discharged from the pump-motor 16 is applied to the pump-motor 15 through the closed circuit 17 to operate the pump-motor 15 as a motor. In turn, the hydraulic rotation torque conducted by the motor action of the pump-motor 15 is fed back to the ring gear 33 through the driving shaft 9, the second reduction gears 10 and 11, the low speed range clutch 12 and the second intermediate shaft 13.

To accelerate the vehicle, the displacement $\delta_{15}$ of the pump-motor 15 is decreased from its negative full displacement to its zero-displacement to control the pumping operation of the pump-motor 16. Then, the low speed output planetary gear train transmits the rotation torque of the input shaft 2 to the output shaft 6 in response to the reaction force exerted on the sun gear 31 from the shaft 18 of the pump-motor 16 through the gears 19 and 20 and the reaction shaft 21. Thus, the continuous decrease of the displacement $\delta_{15}$ of the pump-motor 15 increases the reaction force on the sun gear 31 to increase the rotation torque of the output shaft 6.

When the pump-motor 15 is conditioned to it zero-displacement, no fluid pressure from the pump-motor 16 is applied to the pump-motor 15 to lock the pump-motor 16. As a result, the sun gear 31, the reaction shaft 21 and the gears 19 and 20 are arrested with the shaft 18 locked and, in turn, all of the engine torque given to the input shaft 2 is mechanically transmitted to the output shaft 6 by way of the output planetary gear train. Under this stage, the rotation speed ratio of the output shaft 6 against the input shaft 2 is defined to be a first or low speed range standard speed ratio $e_{cl}$.

In the case the pump-angle of the pump-motor 15 is over-centered or positioned in the positive direction, the pump-motor 15 is directly driven by the driving shaft 9 as a pump to conduct the motor action of the pump-motor 16 and, in turn, the shaft 18 is rotated by the pump-motor 16 in the reverse direction. Thus, the speed ratios $e_{18}$ and $e_{21}$ of the shaft 18 and the reaction shaft 21 against the input shaft 2 increase in accordance with the continuous increase of the pump-angle of the pump-motor 15 toward the positive direction. In this instance, the transmission input torque is split into a first and a second power paths. The first split input torque is mechanically transmitted to the output shaft 6 by way of the output planetary gear train as mentioned above. The other split input torque conducts the pumping action of the pump-motor 15 and is then converted into fluid pressure by the pumping action of the pump-motor 15. This fluid pressure is then applied to the pump-motor 16 through the closed circuit 17 to drive the pump-motor 16 as a motor. The motor action of the pump-motor 16 converts the fluid pressure into the rotation torque of the shaft 18. This rotation torque is finally transmitted to the output shaft 6 by way of the gear train including the gears 19 and 20 and the sun gear 31. In proportion to the increase of the displacement $\delta_{15}$ of the pump-motor 15 in the positive direction, the discharging amount of the pump-motor 15 per rotation of the input shaft 2 increases to proportionately increase the rotation torque of the pump-motor 16, thereby to increase the speed ratio of the hydromechanical transmission over the first standard speed ratio $e_{cl}$. Moreover, in the above mentioned low speed range forward drive, the first intermediate shaft 4 is driven by the second intermediate shaft 13 by way of the second planetary gear set 35.

When the displacement ratio $\delta_{15}$ of the pump-motor 15 reaches its positive maximum value as shown by the point B of FIG. 2, the rotation speed of the first intermediate shaft 4 which has been idling synchronizes with the rotation speed of the input shaft 2 to conduct a mode switch-over speed ratio $e^*$ of the hydromechanical transmission. Thus, the transmission operation moves in its high speed range forward drive from its low speed range forward drive upon disengagement of the low speed range clutch 12 and engagement of the high speed range clutch 3 at the said move switch-over speed ratio $e^*$.

After the engagement of the high speed range clutch 3, the transmission input torque is directly transmitted to the first intermediate shaft 4 across the clutch 3 and, in turn, is split into two power paths within the differential gear unit 5. The first split rotation torque is transmitted to the output shaft 6 by way of the high speed output planetary gear train including the ring gear 38, the pinion 37, the sun gear 36, the ring gear 33 and the pinion 32 and the carrier 34. The second split rotation torque is conveyed to the shaft 18 of the pump-motor 16 by way of the high speed output planetary gear train, the sun gear 31, the reaction shaft 21 and the gears 20 and 19. This rotation torque of the shaft 18 is converted into fluid pressure by pumping operation of the pump-motor 16. The fluid pressure is then applied to the pump-motor 15 through the closed circuit 17 and converted into the rotation torque of the driving shaft 9. This rotation torque is finally fed back to the input shaft 2 by way of the gears 8 and 7.

In this high speed range forward drive, the continuous decrease of the displacement ratio $\delta_{15}$ of the pump-motor 15 in the positive direction increases the reaction force exerted on the sun gear 31 from the pump-motor 16 to increase the speed ratio of the output shaft 6 over the mode switch-over speed ratio $e^*$ in accordance with the increase of the reaction force.

When the displacement ratio $\delta_{15}$ of the pump-motor 15 turns to be zero, the pump-motor 16 stops its pumping operation to lock the sun gear 31. Then, the transmission input torque given to the first intermediate shaft 4 is mechanically transmitted to the output shaft 6 by way of the high speed output planetary gear train. The speed ratio under the mentioned stage is defined as a second or high speed range standard speed ratio $e_{c2}$.

In increase of the displacement ratio $\delta_{15}$ of the pump-motor 15 in the negative direction, the pump-motor 15 conducts its pumping operation to drive the pump-motor 16 as a motor so that the high speed output planetary gear train receives mechanical torque from the first intermediate shaft 4 and hydraulic torque from the pump-motor 16. Thus, the speed ratio of the output shaft 6 is further increased and will reach its maximum value when the displacement ratio $\delta_{15}$ of the pump-motor 15 reaches its negative maximum value as shown by the point C of FIG. 2. Moreover, the reverse procedures of the operation to increase the speed ratio as above mentioned will decrease the speed ratio of the output shaft 6.

To establish the reverse drive power train, the reverse range clutch 24 is engaged to hydraulically transmit the transmission input torque to the output shaft 6 and the low and high speed range clutches 12 and 3 are released to disconnect the mechanical power paths between the input and output shafts 2 and 6. Under this condition, the pump-motor 15 of the hydrostatic drive unit 14 is conditioned to its zero-displacement. Thus, the pump-motor 15 is driven as a pump by the transmission input torque to conduct the motor action of the pump-motor 16 and the shaft 18 is drivingly connected to the output shaft 6 by way of the gears 22 and 23 and the reverse range clutch 24. When the displacement of the pump-motor 15 is increased from its zero-displacement toward the negative direction, the shaft 18 is driven by the motor action of the pump-motor 16 in the same direction as the input shaft 2 to drive the output shaft 6 in the reverse direction. Then, the speed ratio of the output shaft 6 increases in accordance with the increase of the displacement of the pump-motor 15.

The respective speed ratios $e_4$, $e_{13}$, $e_{18}$ and $e_{21}$ of the shafts 4, 13, 18 and 21 shown in FIG. 3 are derived as follows.

In a premise that, $\rho_1$ represents the gear ratio between the sun gear 31 and the ring gear 33, $\rho_2$ represents the gear ratio between the sun gear 36 and the ring gear 38, $i$ represents the reduction gear ratio between the gears 7, 8, 10 and 11, $n_4$ represents the rotation speed of the first intermediate shaft 4, $n_{13}$ represents the rotation speed of the second intermediate shaft 13, $n_{21}$ represents the rotation speed of the reaction shaft 21, $n_6$ represents the rotation speed of the output shaft 6, and $n'$ represents the rotation speed of the sun gear 31 corresponding with the rotation speed of the reaction shaft 21, the two following equalities are satisfied.

$$\rho_1 n' + n_{13} = (1\ 30\ \rho_1)n_6$$

$$\rho_2 n_{13} + n_4 = (1 + \rho_2)n_6$$

Thus, in the above mentioned low speed forward drive, the speed ratios $e_{13}$, $e_{21}$ and $e_4$ of the second intermediate shaft 13, the reaction shaft 21 and the first intermediate shaft 4 against the input shaft 2 are derived from the following equalities in a premise that the rotation speed of the input shaft 2 is indicated by $n_2$ and the speed ratio of the output shaft 6 against the input shaft 21 is represented by $e$.

$$n_{13} = n_2/i$$

$$\frac{n_{21}}{n_2} = \frac{n'}{n_2} = \frac{(1+\rho_1)e}{\rho_1} - \frac{1}{\rho_1 i}$$

$$\frac{n_4}{n_2} = (1+\rho_2)e - \frac{\rho_2}{i}$$

In the above mentioned high speed forward drive, the speed ratios $e_4$, $e_{13}$ and $e_{21}$ are derived from the equalities described below.

$$n_4 = n_2$$

$$\frac{n_{13}}{n_2} = \frac{(1+\rho_2)e - 1}{\rho_2}$$

$$\frac{n_{21}}{n_2} = \frac{n'}{n_2} = \frac{(\rho_1\rho_2 - 1)e + 1}{\rho_1\rho_2}$$

Furthermore, the speed ratio $e_{18}$ of the shaft 18 against the input shaft 2 in the low speed range forward drive is derived from the following equality in a premise that the rotation speed of the shaft 18 is represented by $n_{18}$ and the reduction gear ratio between the gears 19 and 20 is represented by $i'$.

$$\frac{n_{18}}{n_2} = \frac{(1+\rho_1)e}{\rho_1 i'} - \frac{1}{\rho_1 i i'}$$

The speed ratio $e_{1B}$ in the high speed range forward drive is derived from the equality described below.

$$\frac{n_{1B}}{n_2} = \frac{(\rho_1\rho_2 - 1)e + 1}{\rho_1\rho_2 \, i'}$$

In FIG. 3, the low and high speed range standard speed ratios $e_{c1}$ and $e_{c2}$ of the output shaft 6 are derived from the following equalities.

$$e_{c1} = \frac{1}{i(1+\rho_1)}$$
$$e_{c2} = \frac{1}{1-\rho_1\rho_2}$$

In these equalities, assuming that $\rho_1$ is 0.333, $\rho_2$ is 0.5 and $i$ is 2.5, the standard speed ratios $e_{c1}$ and $e_{c2}$ are respectively derived as 0.3 and 1.2. Thus, when the mode switch-over speed ratio $e^*$ is derived as 0.8, the speed ratio $e$ of the output shaft 6 in the forward drive is obtained in a range represented by an inequality, $0 \leq e \leq 1.6$.

Figure 4:
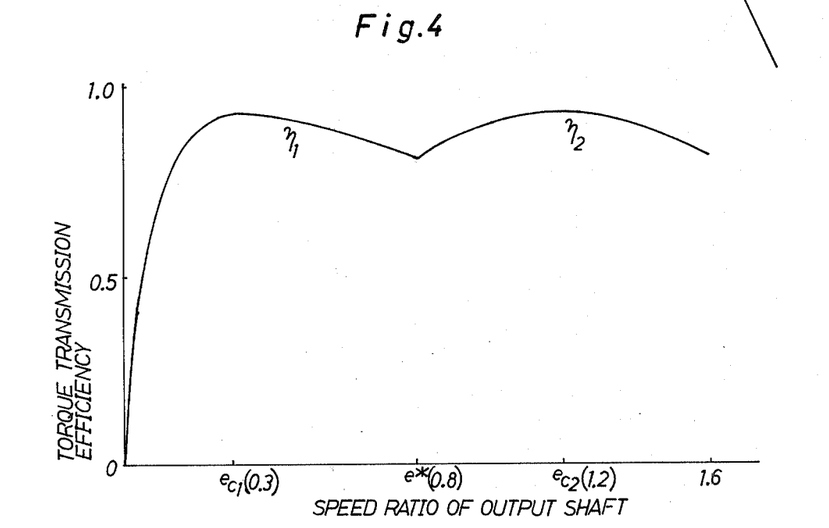

FIG. 4 indicates the torque transmission efficiency in the above mentioned forward drive. In the figure, reference characters $\eta_1$ and $\eta_2$ represent respectively the efficiencies in the low and high speed forward drive. These efficiencies $\eta_1$ and $\eta_2$ rise up in accordance with the increase of the speed ratio $e$ of the output shaft 6 and reach their maximum values respectively at the standard speed ratios $e_{c1}$ and $e_{c2}$. The over-all torque transmission efficiency is, therefore, obtained by combination of the low and high speed range operations with the switch-over point at the mode switch-over speed ratio $e^=$. Thus, the torque transmission efficiency at the mode switch-over ratio $e^=$ is maintained in a higher value.

Figure 5:
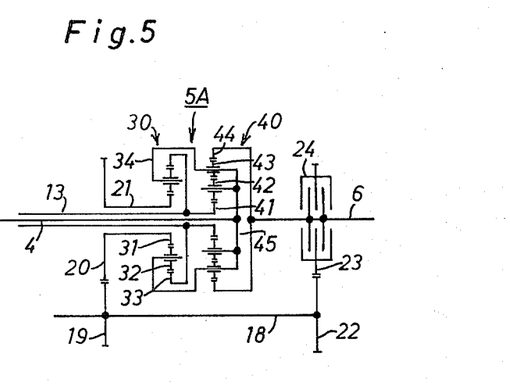
FIGS. 5 through 8 illustrate respectively partial skeleton diagrams of the modifications of the differential gear unit of the embodiment shown in FIG. 1.

In reference with FIG. 5, disclosed is a modification 5A of the differential gear unit 5 as mentioned above, wherein the features are the construction and connection of a second double planetary gear set 40 which replaces the second single planetary gear set 35 shown in FIG. 1. The second double planetary gear set 40 comprises a sun gear 41 connected to the second intermediate shaft 13, a first pinion 42 in mesh with the sun gear 41, a second pinion 43 in mesh with the first pinion 42, and a ring gear 44 meshing with the second pinion 43. The pinions 42 and 43 are journalled by a carrier member 45 which is connected to the first intermediate shaft 4. In this differential gear unit 5A, the carrier member 34 of the first single planetary gear set 30 is connected to the first intermediate shaft 4 by way of the carrier member 45, while the ring gear 44 is connected to the output shaft 6.

Thus, the low and high speed range standard speed ratios $e_{c1}$ and $e_{c2}$ of a hydromechanical transmission having the differential gear unit 5A becomes same as those of the hydromechanical transmission shown in FIG. 1 when respective gear ratios of the first single planetary gear set 30 and the second double planetary gear set 40 are 0.6 and 0.333 and the speed reduction gear ratio of the transmission is 2.5.

Figure 6:
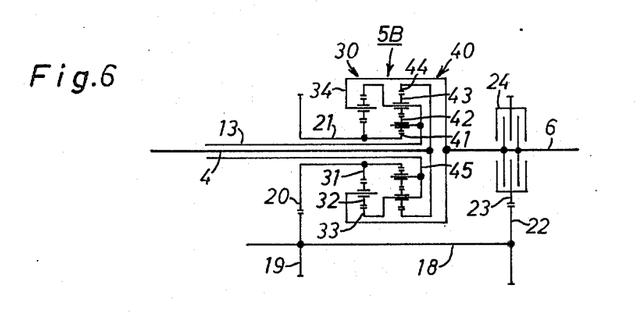

FIG. 6 illustrates another modification 5B of the above mentioned differential gear unit 5A, characterized in that the sun gears 31 and 41 are connected to the reaction shaft 21. In this modified differential gear unit 5B, the carrier member 45 journalling the pinions 42 and 43 is connected to the second intermediate shaft 13 and the ring gear 44 is connected to the first intermediate shaft 4. The ring gear 33 of the first single planetary gear set 30 is connected to the second intermediate shaft 13 by way of the carrier member 45 and the pinion 32 is connected to the output shaft 6 by way of the carrier member 34.

Thus, the low and high speed range standard speed ratios $e_{c1}$ and $e_{c2}$ of a hydromechanical transmission having the differential gear unit 5B becomes same as those of the hydromechanical transmission shown in FIG. 1 when respective gear ratios of the first and second planetary gear sets 30 and 40 are 0.333 and 0.375 and the speed reduction gear ratio of the transmission is 2.5.

Figure 7:
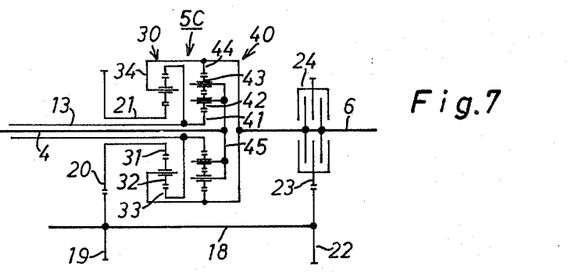

A further modification 5C of the above mentioned differential gear unit 5A is shown in FIG. 7, wherein the carrier member 34 of the first planetary gear set 30 is integrally connected to the output shaft 6 together with the ring gear 44 of the double planetary gear set 40. All other constructions are same as those of the differential gear unit 5A shown in FIG. 5.

Thus, the low and high speed range standard speed ratios $e_{c1}$ and $e_{c2}$ of a hydromechanical transmission having the differential gear unit 5C becomes same as those of the hydromechanical transmission shown in FIG. 1 when both of gear ratios of the first and second planetary gear sets 30 and 40 are 0.333 and the speed reduction gear ratio of the transmission is 2.5.

Figure 8:
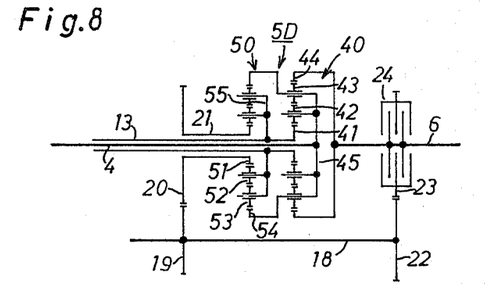

In FIG. 8, disclosed is a modification 5D of the differential gear unit 5A in which the single planetary gear set 30 is replaced with a first double planetary gear set 50. The first double planetary gear set 50 comprises a sun gear 51 connected to the reaction shaft 21, a first pinion 52 in mesh with the sun gear 51, a second pinion 53 in mesh with the first pinion 52 and a ring gear 54 in mesh with the second pinion 53. A carrier member 55 journalling the first and second pinions 52 and 53 is connected to the second intermediate shaft 13 and the ring gear 54 is connected to the first intermediate shaft 4 by way of the carrier member 45.

Thus, the low and high speed range standard speed ratios $e_{c1}$ and $e_{c2}$ of a hydromechanical transmission having the differential gear unit 5D becomes same as those of the hydromechanical transmission shown in FIG. 1 when respective gear ratios of the first and second double planetary gear sets 50 and 40 are 0.375 and 0.333 and the speed reduction gear ratio of the transmission is 2.5.

Another preferred embodiment of the hydromechanical transmission in accordance with the present invention is disclosed hereinafter particularly in reference with FIG. 9. In this embodiment, the transmission input shaft 2 driven by the prime engine 1 is coaxially connected with the output shaft 6 by way of the high speed range clutch 3, the first intermediate shaft 4, a modified differential gear unit 5E and the reverse range clutch 24 as same as the previous embodiment shown in FIG. 1. The distinguished differences from the previous embodiment are mainly observed in the arrangement of a low speed range clutch 12a, and pump-motors 15a and 16a. The clutch 12a and the pump-motors 15a and 16a correspond respectively with the low speed range clutch 12 and the pump-motors 15 and 16 shown in FIG. 1.

The pump-motor 15a is mounted on the driving shaft 9 between the reduction gears 8 and 10, while the pump-motor 16a is connected to a shaft 18a corresponding with the shaft 18 of the previous embodiment. The shaft 18a is arranged symmetrically with the driving shaft 9 around the first intermediate shaft 4 and provided thereon with a gear 19a in mesh with a gear 20a which is fixed on a reaction shaft 21a in surrounding relationship to the first intermediate shaft 4. The shaft 18a is also provided thereon with a gear 22a in mesh with a gear 23a which is connected to the input member of the reverse range clutch 24. The gears 19a, 20a, 22a and 23a correspond respectively with the gears 19, 20, 22 and 23 of the previous embodiment shown in FIG. 1.

The differential gear unit 5E comprises a first single planetary gear set 30e connected to the output member of the low speed range clutch 12a by way of a second intermediate shaft 13a which is in surrounding relationship to the reaction shaft 21a. The first single planetary gear set 30e includes a sun gear 31e connected to the second intermediate shaft 13e, a pinion 32e in mesh with the sun gear 31e and a ring gear 33e in mesh with the pinion 32e. A carrier member 34e journalling the pinion 32e is connected to the output shaft 6 and the ring gear 33e is connected to the first intermediate shaft 4 by way of a carrier member 39e for a second single planetary gear set 35e. The second single planetary gear set 35e includes a sun gear 36e connected to the reaction shaft 21a, pinion 37e journalled by the carrier member 39e to be meshed with the sun gear 36e, and a ring gear 38e connected to the second intermediate shaft 13a to be meshed with the pinion 37e. All other constructions remain unchanged and same reference numerals are used for the same component parts and portions of the previous embodiment and all the operation features and procedures are same as in the previous embodiment and no repetition is made hereinafter.

Moreover, in this embodiment, the above mentioned low and high speed range standard speed ratios $e_{c1}$ and $e_{c2}$ are obtained as those of the previous embodiment shown in FIG. 1 when respective gear ratios of the first and second single planetary gear sets 30e and 35e are 0.5 and 0.6 and the speed reduction gear ratio of the transmission is 2.5.

Figure 9:
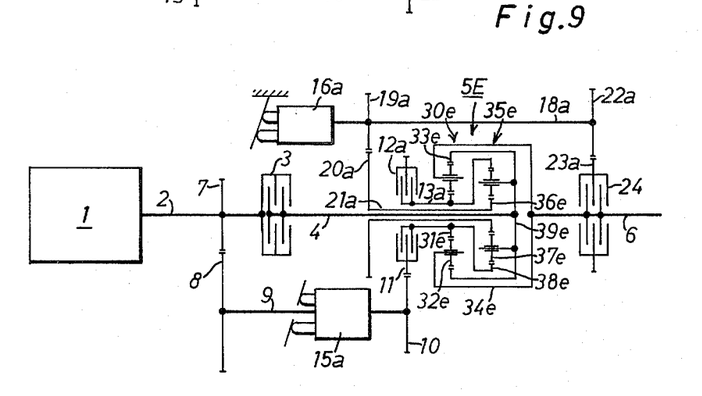
FIG. 9 is a schematic skeleton view showing another embodiment of the present invention.
Figure 10:
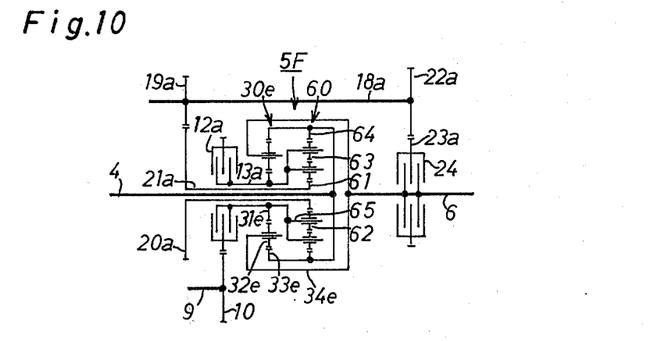
FIG. 10 depicts a partially schematic diagram of a modification of the differential gear unit shown in FIG. 9.

In FIG. 10, disclosed is a modification 5F of the differential gear unit 5E shown in FIG. 9 in which the second single planetary gear set 35e is replaced with a second double planetary gear set 60. The second double planetary gear set 60 comprises a sun gear 61 connected to the reaction shaft 21a, a first pinion 62 in mesh with the sun gear 61, a second pinion 62 in mesh with the first pinion 62, and a ring gear 64 in mesh with the second pinion 63. A carrier member 65 journalling the first and second pinions 62 and 63 is connected to the second intermediate shaft 13a and the ring gear 64 is connected to the first intermediate shaft 4.

Thus, the low and high speed range standard speed ratios $e_{c1}$ and $e_{c2}$ of a hydromechanical transmission having the differential gear unit 5F becomes same as those of the hydromechanical transmission shown in FIG. 1 when respective gear ratios of the first and second planetary gear sets 30e and 60 are 0.5 and 0.375 and the speed reduction gear ratio of the transmission is 2.5.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A hydromechanical transmission comprising:
   a transmission input shaft;
   an output shaft;
   a hydraulically controlled differential gear unit including a first planetary gear set drivingly connected to said output shaft for providing a low speed range drive power train between said input and output shafts and a second planetary gear set drivingly connected to said output shaft for providing a high speed range drive power train between said input and output shafts;
   a first clutch interposed between said input shaft and the input member of said first planetary gear set by way of a speed reduction gear train for selectively connecting said input shaft to said first planetary gear set;
   a second clutch interposed between said input shaft and the input member of said second planetary gear set for directly connecting said input shaft to said second planetary gear set on engagement thereof; and
   a variable ratio hydrostatic drive unit including a first variable positive displacement pump-motor drivingly connected to said input shaft and a second fixed positive displacement pump-motor drivingly connected with a reaction element for said first and second planetary gear sets, said first and second pump-motors being hydraulically connected to each other; whereby on engagement of said first clutch, rotation speed of said input shaft is reduced by said speed reduction gear train and transmitted to said first planetary gear set to control the speed ratio of said output shaft in response to the operation of said hydrostatic drive unit, and on engagement of said second clutch, rotation torque of said input shaft is directly transmitted to said second planetary gear set to control the speed ratio of said output shaft in response to the operation of said hydrostatic drive unit.

2. A hydromechanical transmission as set forth in claim 1, wherein said input and output shafts are axially aligned and said first and second planetary gear sets and said first and second clutches are concentrically arranged with the axes of said input and output shafts.

3. A hydromechanical transmission as set forth in claim 2, wherein said first pump-motor is provided on a driving shaft in parallel with the axes of said input and output shafts to be driven by said input shaft through said speed reduction gear train and the output shaft of said second pump-motor is axially aligned with said driving shaft.

4. A hydromechanical transmission as set forth in claim 2, wherein said first pump-motor is provided on a driving shaft in parallel with the axes of said input and output shafts to be driven by said input shaft through said speed reduction gear train and the output shaft of said second pump-motor is arranged in parallel with the axes of said input and output shafts at the opposite side of said first pump-motor.

5. A hydromechanical transmission as set forth in claim 1, further comprising a third clutch for selectively connecting said input shaft to said output shaft through said hydrostatic drive unit to drive said output shaft in reverse, said third clutch being drivingly connected at its input member to the output shaft of said second pump-motor and at its output member to said output shaft.

6. A hydromechanical transmission as set forth in claim 1, wherein said first planetary gear set comprises a first sun gear connected to said reaction element, a first ring gear drivingly connected to the output member of said first clutch, and a first pinion journalled by a first carrier member connected to said output shaft and in mesh with said first sun gear and said first ring gear; and said second planetary gear set comprises a second sun gear drivingly connected to the output member of said first clutch, a second ring gear drivingly connected to the output member of said second clutch, and a second pinion journalled by a second carrier member connected to said output shaft and in mesh with said second sun gear and said second ring gear.

7. A hydromechanical transmission as set forth in claim 1, wherein said first planetary gear set comprises a first sun gear drivingly connected to the output shaft of said second pump-motor, a first ring gear connected to the output member of said first clutch, a first pinion journalled by a first carrier member drivingly connected to the output member of said second clutch and in mesh with said first sun gear and said first ring gear; and said second planetary gear set is a double planetary gear set comprising a second sun gear drivingly connected to the output member of said first clutch, a second ring gear connected to said output shaft, a second pinion journalled by said first carrier member and in mesh with said second sun gear, and a third pinion journalled by said first carrier member and in mesh with said second pinion and said second ring gear.

8. A hydromechanical transmission as set forth in claim 1, wherein said first planetary gear set comprises a first sun gear drivingly connected to the output member of said second pump-motor, a first ring gear united with a first carrier member connected the output member of said first clutch, and a first pinion journalled by a second carrier member connected to said output shaft and in mesh with said first sun gear and said first ring gear; and said second planetary gear set is a double planetary gear set comprising a second sun gear connected to the output shaft of said second pump-motor, a second ring gear drivingly connected to the output member of said second clutch, a second pinion journalled by said first carrier member and in mesh with said second sun gear, and a third pinion journalled by said first carrier member and in mesh with said second pinion and said second ring gear.

9. A hydromechanical transmission as set forth in claim 1, wherein said first planetary gear set comprises a first sun gear drivingly connected to the output shaft of said second pump-motor, a first ring gear drivingly connected to the output member of said first clutch, and a first pinion journalled by a first carrier member connected to said output shaft; and said second planetary gear set is a double planetary gear set comprising a second sun gear connected to the output member of said first clutch, a second ring gear connected to said output shaft by way of said first carrier member, a second pinion journalled by a second carrier member drivingly connected to the output member of said second clutch and in mesh with said second sun gear, and a third pinion journalled by said second carrier member and in mesh with said second pinion and said second ring gear.

10. A hydromechanical transmission as set forth in claim 1, wherein said first planetary gear set is a double planetary gear set comprising a first sun gear connected to the output shaft of said second pump-motor, a first ring gear united with a first carrier member drivingly connected to the output member of said second clutch, a first pinion journalled by a second carrier member drivingly connected to the output member of said first clutch and in mesh with said first sun gear, and a second pinion journalled by said second carrier member and in mesh with said first pinion and said first ring gear; and said second planetary gear set is a double planetary gear set comprising a second sun gear connected to the output member of said first clutch, a second ring gear connected to said output shaft, a third pinion journalled by said first carrier member and in mesh with said second sun gear, and a fourth pinion journalled by said first carrier member and in mesh with said third pinion and said second ring gear.

11. A hydromechanical transmission as set forth in claim 1, wherein said first planetary gear set comprises a first sun gear connected to the output member of said first clutch, a first ring gear united with a first carrier member drivingly connected to the output member of said second clutch, and a first pinion journalled by a second carrier member connected to said output shaft and in mesh with said first sun gear and said first ring gear; and said second planetary gear set comprises a second sun gear connected to the output shaft of said second pump-motor, a second ring gear connected to the output member of said first clutch, and a second pinion journalled by said first carrier member and in mesh with said second sun gear and said second ring gear.

12. A hydromechanical transmission as set forth in claim 1, wherein said first planetary gear set comprises a first sun gear connected to the output member of said first clutch, a first ring gear connected to the output member of said second clutch, and a first pinion journalled by a first carrier member connected to said output shaft and in mesh with said first sun gear and said first ring gear; and said second planetary gear set is a double planetary gear set comprising a second sun gear drivingly connected to the output shaft of said second pump-motor, a second ring gear connected to the output member of said second clutch, a second pinion journalled by a second carrier member connected to the output member of said first clutch and in mesh with said second sun gear, and a third pinion journalled by said second carrier member and in mesh with said second pinion and said second ring gear.

* * * * *